United States Patent
Lee et al.

(10) Patent No.: US 11,851,554 B2
(45) Date of Patent: Dec. 26, 2023

(54) RUBBER COMPOSITION FOR A VEHICLE PART

(71) Applicants: Hyundai Motor Company, Seoul (KR); Kia Corporation, Seoul (KR)

(72) Inventors: Sung Hyun Lee, Gyeonggi-do (KR); Heon Seob Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/901,939

(22) Filed: Sep. 2, 2022

(65) Prior Publication Data

US 2023/0074171 A1 Mar. 9, 2023

(30) Foreign Application Priority Data

Sep. 3, 2021 (KR) .......................... 10-2021-0117535

(51) Int. Cl.
*C08L 23/16* (2006.01)
*C08L 7/00* (2006.01)

(52) U.S. Cl.
CPC ................. *C08L 23/16* (2013.01); *C08L 7/00* (2013.01); *C08L 2205/025* (2013.01); *C08L 2205/03* (2013.01)

(58) Field of Classification Search
CPC ......... C08L 23/16; C08L 7/00; C08L 2205/03
See application file for complete search history.

(56) References Cited

U.S. PATENT DOCUMENTS

| | | | |
|---|---|---|---|
| 4,076,550 A | * | 2/1978 | Thurn ..................... C23F 11/16 106/490 |
| 2002/0061979 A1 | * | 5/2002 | Wolff ....................... C08K 9/06 525/329.3 |

FOREIGN PATENT DOCUMENTS

| KR | 10-0802811 B1 | 2/2008 |
|---|---|---|
| KR | 10-2012-0000258 A | 1/2012 |
| KR | 10-1338005 B1 | 12/2013 |
| KR | 10-2019-0008719 A | 1/2019 |

* cited by examiner

*Primary Examiner* — Ling Siu Choi
*Assistant Examiner* — Andrea Wu
(74) *Attorney, Agent, or Firm* — Fox Rothschild LLP

(57) ABSTRACT

Disclosed is a rubber composition including a copolymer including polyethylene, α-olefin, and non-conjugated polyene; natural rubber; a filler; and a coupling agent, a vehicle part including the same, and a vehicle including the same. The rubber bushing composition includes the components uniformly dispersed such that compatibility and physical properties thereof can be improved. Further, a product (e.g., vehicle part) obtained from the rubber bushing composition can have superior heat resistance, fatigue resistance, and compression set resistance.

9 Claims, No Drawings

RUBBER COMPOSITION FOR A VEHICLE PART

CROSS-REFERENCE TO RELATED APPLICATION

This application claims under 35 U.S.C. § 119(a) the benefit of priority from Korean Patent Application No. 10-2021-0117535, filed on Sep. 3, 2021, the entire contents of which are incorporated herein by reference.

TECHNICAL FIELD

The present invention relates to a rubber bushing composition having excellent heat resistance, fatigue resistance, and compression set resistance, and a vehicle part and a vehicle including the same.

BACKGROUND

An automotive suspension system supports the weight of the body by the action of a spring and at the same time alleviates transmission of vertical vibration of the wheel, thereby improving riding comfort, preventing damage due to the impact of the automobile, and preventing an excessive load from being applied to individual parts.

In particular, a stabilizer, which is part of the automotive suspension system, keeps the automobile level by preventing leftward and rightward vibration. In order to prevent variations in left and right wheel travel of the lower body suspension, in the stabilizer minimizes rolling, which is closely related to driving performance.

As such, a rubber bushing, which is a rubber material for supporting the stabilizer bar, has been used to prevent the body of the automobile from being greatly tilted during cornering, and must be sufficiently durable to resist large external force applied from the outside in order to prevent noise and vibration of the automobile and thereby improve riding comfort.

In the related art, in the case of an rubber material such as a stabilizer bar, when heat resistance is ensured through mixing of synthetic rubber and other additives, hardness may not be sufficient due to insufficient fatigue resistance and compression set resistance, whereas when fatigue resistance and compression set resistance are attained through mixing of natural rubber and other additives, the resultant lack of heat resistance makes it difficult to apply to high-efficiency turbo engines and temperate areas vulnerable to seasonal temperature changes.

SUMMARY

In preferred aspects, provided are a rubber composition, which includes a copolymer made of ethylene, α-olefin, and non-conjugated polyene; natural rubber; a filler; and a coupling agent. Preferably, the copolymer may include an oil-extended ethylene/propylene/non-conjugated diene terpolymers (EPDM) and non-oil-extended ethylene/propylene/non-conjugated diene terpolymers ethylene/propylene/non-conjugated diene terpolymers (EPDM).

The objects of the present invention are not limited to the foregoing, and will be able to be clearly understood through the following description and to be realized by the means described in the claims and combinations thereof.

In an aspect, provided is a rubber composition including a copolymer including ethylene, α-olefin, and non-conjugated polyene ("ethylene/α-olefin/non-conjugated polyene copolymer"), natural rubber, a filler, and a coupling agent. In particular, the coupling agent may include a compound containing silicon (Si), for example, a silane coupling agent.

The term "silane coupling agent" refers to a compound including silicon, hydrolyzable group (e.g., alkoxy, acyloxy, halogen, or amine) directly attached to the silicon, alkylene and organofunctional group. Exemplary silane coupling agents may form organosilane with a substrate, which may change or improve wetting or adhesion characteristics of the substrate, e.g., by affecting a covalent bond formation between organic and inorganic materials.

The rubber composition may include an amount of about 50 parts by weight to 70 parts by weight of the copolymer, an amount of about 30 parts by weight to 50 parts by weight of the natural rubber, an amount of about 50 parts by weight to 70 parts by weight of the filler, and an amount of about 1 part by weight to 10 parts by weight of a silane-coupling agent, based on 100 parts by weight of the composition.

The copolymer may include an amount of about 15 parts by weight to 25 parts by weight of an oil-extended ethylene/propylene/non-conjugated diene terpolymer (oil-extended EPDM) and an amount of about 35 parts by weight to 45 parts by weight of a non-oil-extended ethylene/propylene/non-conjugated diene terpolymer (non-oil-extended EPDM).

The oil-extended ethylene/propylene/non-conjugated diene terpolymer (oil-extended EPDM) may include an amount of about 65 mass % to 75 mass % of a repeating unit derived from ethylene based on a total of 100 mass % thereof.

The non-oil-extended ethylene/propylene/non-conjugated diene terpolymer (non-oil-extended EPDM) may include an amount of about 65 mass % to 75 mass % of a repeating unit derived from ethylene based on a total of 100 mass % thereof.

The filler may include carbon black having a particle diameter of 40 nm to 44 nm. The particle diameter may be determined or measured by a maximal distance between two points on the particle.

The rubber composition may further include an additive comprising one or more selected from the group consisting of an activator, an antioxidant, sulfur, and a vulcanization accelerator.

In another aspect, provided is a vehicle part (e.g., rubber bushing for a vehicle) that includes the rubber composition as described herein.

Also provided is a vehicle that includes the vehicle part or the rubber composition as described herein.

Other aspects of the invention are disclosed infra.

DETAILED DESCRIPTION

The above and other objects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values within the stated range, including the end points. For example, the range of "5 to 10" will be understood to include any subranges, such as 6 to 10, 7 to 10, 6 to 9, 7 to 9 and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

A conventional rubber composition used for a vehicle part, such as rubber bushing, has heat resistance through inclusion of synthetic rubber and other additives, but high hardness may not be obtained due to insufficient fatigue resistance and compression set resistance. Moreover, when fatigue resistance and compression set resistance are attained through mixing of natural rubber and other additives, the resultant lack of heat resistance makes it difficult to apply to high-efficiency turbo engines and temperate areas vulnerable to seasonal temperature changes.

Provided herein, inter alia, is a rubber composition including a copolymer including ethylene, α-olefin, and non-conjugated polyene; natural rubber; a filler; and a coupling agent so as to improve compatibility and physical properties. Moreover, heat resistance, fatigue resistance, and compression set resistance of the rubber composition may be improved, which may be suitable for an automotive rubber bushing composition.

Preferably, the rubber may include a copolymer including ethylene, α-olefin, and non-conjugated polyene, natural rubber, a filler, and a coupling agent in appropriate amounts. Particularly, the rubber composition may withstand high temperatures from engine/environment as well as torsional load/fatigue. The rubber composition may suitably include an amount of about 50 parts by weight to 70 parts by weight of an ethylene/α-olefininon-conjugated polyene copolymer that satisfies appropriate conditions, an amount of about 30 parts by weight to 50 parts by weight of natural rubber, an amount of about 50 parts by weight to 70 parts by weight of a filler, and an amount of about 1 part by weight to 10 parts by weight of the-coupling agent, based on 100 parts by weight of the composition. In particular, the coupling agent may be a silane coupling agent. Preferably, the rubber composition may suitably include an amount of about 50 parts by weight to 70 parts by weight of an ethylene/α-olefin/non-conjugated polyene copolymer that satisfies appropriate conditions, an amount of about 30 parts by weight to 50 parts by weight of natural rubber, an amount of about 50 parts by weight to 70 parts by weight of a filler, and an amount of about 1 part by weight to 10 parts by weight of the silane coupling agent, based on 100 parts by weight of the composition.

The copolymer including ethylene, α-olefin, and non-conjugated polyene may be a synthetic rubber, and is not particularly limited, so long as it is capable of simultaneously ensuring heat resistance and physical properties such as rigidity while improving mixing dispersibility.

Preferably, the copolymer may include a polymer in which repeating units of ethylene, α-olefin, and non-conjugated polyene are randomly copolymerized.

The α-olefin may suitably include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 9-methyl-1-decease, 11-methyl-1-dodecene, 12-ethyl-1-tetradecene, and the like, which may be used alone or in combinations of two or more thereof. Preferably, α-olefin may have 3 to 10 carbon atoms, for example, propylene, 1-butene, 1-hexene, 1-octene, and the like may be particularly used.

The non-conjugated polyene may be a cyclic or chain non-conjugated polyene. Non-limiting examples of the cyclic non-conjugated polyene may include 5-ethylidene-2-norbornene, dicyclopentadiene, 5-vinyl-2-norbornene, norbornadiene, methyl tenahydroindene, and the like, and examples of the chain non-conjugated polyene may include 1,4-hexadiene, 7-methyl-1,6-octadiene, 4-ethylidene-8-methyl-1,7-nonadiene, 4-ethylidene-1,7-undecadiene, and the like, and these non-conjugated polyenes may be used alone or in combinations of two or more thereof.

Accordingly, the copolymer preferably includes one or more selected from the group consisting of EPDM and EBDM, and more preferably includes EPDM having excellent heat resistance and weather resistance.

The copolymer in the rubber composition may suitably include EPDM, particularly an oil-extended ethylene/propylene/non-conjugated diene terpolymer (oil-extended EPDM) and a non-oil-extended ethylene/propylene/non-conjugated diene terpolymer (non-oil-extended EPDM) at an appropriate ratio, in order to simultaneously realize heat resistance and physical properties such as rigidity while improving mixing dispersibility.

In the oil-extended ethylene/propylene/non-conjugated diene terpolymer (oil-extended EPDM), the amount of the repeating unit derived from non-conjugated diene may be about 4.0 mass % to 5.0 mass % and the amount of the repeating unit derived from ethylene may be about 65 mass % to 75 mass % based on a total of 100 mass % of the repeating unit derived from ethylene, the repeating unit derived from propylene, and the repeating unit derived from non-conjugated diene. Also, the Mooney viscosity ML(1+4) (125° C.) may be about 55 to 60.

When the amount of the repeating unit derived from non-conjugated diene of the oil-extended ethylene/propylene/non-conjugated diene terpolymer (oil-extended EPDM) is less than the predetermined amount, e.g., less than about 4.0 mass %, the mechanical properties of the rubber compound may be deteriorated. When the amount thereof is greater than the predetermined amount, e.g., greater than about 5.0 mass %, processability may be deteriorated. Also, when the amount of the repeating unit derived from ethylene is less than the predetermined amount, e.g., less than about 65 mass %, dispersion of natural rubber and other additives may be non-uniform due to insufficient processability. When the amount thereof is greater than the predetermined amount, e.g., greater than about 75 mass %, resilience of the copolymer elastomer is lost, and the usefulness and applicability of the final compound are limited. Also, when the Mooney viscosity is less than about the predetermined value, e.g., less than about 55, mechanical properties may be deteriorated, whereas when it is greater than about the predetermined value, e.g., greater than about 60, processability may be deteriorated.

Meanwhile, in the non-oil-extended ethylene/propylene/non-conjugated diene terpolymer (non-oil-extended EPDM), the amount of the repeating unit derived from non-conjugated diene may be about 4.0 mass % to 5.0 mass % and the amount of the repeating unit derived from ethylene may be about 65 mass % to 75 mass % based on a total of 100 mass % of the repeating unit derived from ethylene, the repeating unit derived from propylene, and the repeating unit derived from non-conjugated diene. Also, the Mooney viscosity ML(1+4) (125° C.) may be about 50 to 55.

When the amount of the repeating unit derived from non-conjugated diene of the non-oil-extended ethylene/propylene/non-conjugated diene terpolymer (non-oil-extended EPDM) is less than about the predetermined amount, e.g., less than about 4.0 mass %, mechanical properties may be deteriorated. When the amount thereof is greater than about the predetermined amount, e.g., greater than about 5.0 mass %, processability may be deteriorated. Also, when the amount of the repeating unit derived from ethylene is less than about the predetermined amount, e.g., less than about 65 mass %, dispersion of natural rubber and other additives may be non-uniform due to insufficient processability, and when the amount thereof is greater than about the predetermined amount, e.g., less than about 75 mass %, resilience of the copolymer elastomer is lost, and the usefulness and applicability of the final compound are limited. Further, when the Mooney viscosity is less than about the predetermined value, e.g., less than about 50, mechanical properties may be deteriorated, and when it is greater than about the predetermined value, e.g., greater than about 55, processability may be deteriorated.

Preferably, the copolymer may suitably EPDMs satisfying the above characteristics, particularly an amount of about 15 parts by weight to 25 parts by weight of the oil-extended ethylene/propylene/non-conjugated diene terpolymer (oil-extended EPDM) and an amount of about 35 parts by weight to 45 parts by weight of the non-oil-extended ethylene/propylene/non-conjugated diene terpolymer (non-oil-extended EPDM), and consequently includes an amount of about 50 parts by weight to 70 parts by weight of the copolymer, based on 100 parts by weight of the composition.

When the amount of the oil-extended ethylene/propylene/non-conjugated diene terpolymer (oil-extended EPDM) is less than about the predetermined amount, e.g., less than about 15 parts by weight, processability may be deteriorated, and when the amount thereof is greater than about the predetermined amount, e.g., greater than about 25 parts by weight, poor durability performance due to oil blooming may result. Also, when the amount of the non-oil-extended ethylene/propylene/non-conjugated diene terpolymer (non-oil-extended EPDM) is less than about the predetermined amount, e.g., less than about 35 parts by weight, mechanical properties may be deteriorated, and when the amount thereof is greater than about the predetermined amount, e.g., greater than about 35 parts by weight, processability may become poor.

The natural rubber is not particularly limited, so long as it is able to improve mixing dispersibility and at the same time improve fatigue durability and compression set resistance.

The viscosity of the natural rubber, preferably the Mooney viscosity ($ML_{1+4}$, 100° C.) of unvulcanized rubber, may range from about 55 to about 65. When the Mooney viscosity of the natural rubber is less than about the predetermined value, e.g., less than about 55, the mechanical strength of the composition may be decreased, and when the viscosity of the natural rubber is greater than about the predetermined amount, e.g., greater than about 65, processability may be deteriorated and scorching may occur.

In particular, the natural rubber is preferably included in an amount of about 30 parts by weight to 50 parts by weight, based on 100 parts by weight of the composition. When the amount of natural rubber is less than about the predetermined amount, e.g., less than about 30 parts by weight, the improvement in fatigue resistance is limited, whereas if the amount of natural rubber is greater than about the predetermined amount, e.g., greater than about 50 parts by weight, heat resistance may be limited due to the lack of EPDM.

Particularly, the rubber composition may suitably include an amount of about 50 wt % to 70 wt % of the copolymer and an amount of about 30 wt % to 50 wt % of the natural rubber based on 100 wt % of the total weight of the ethylene/α-olefin/non-conjugated polyene copolymer and the natural rubber. As such, the rubber composition satisfying the above amount range may be uniformly dispersed with a filler owing to use of a coupling agent to be described later, so compatibility may be improved, and thus physical properties may be improved. Further, heat resistance, fatigue resistance, and compression set resistance may be improved at the same time.

The filler is not particularly limited, so long as it is able to improve mechanical properties such as rigidity of the rubber composition including the same.

The filler may include, for example, one or more selected from the group consisting of carbon black, calcium carbonate, glass fiber, and talc, and preferably, carbon black, capable of imparting excellent mechanical strength and rigidity to the composition, may be used.

The filler may suitably include carbon black, particularly FEF (fast extruding furnace) carbon black having a particle diameter of about 40 nm to 44 nm in the present invention. When the particle diameter of carbon black is less than about the predetermined value, e.g., less than about 40 nm, friction between particles may increase and the rubber may be heated by external force, and when the particle diameter thereof is greater than about the predetermined value, e.g., greater than about 44 nm, friction may be decreased, but noise/vibration problems may occur under the vehicle body due to deterioration of the vibration insulation performance of the compound.

The filler may be included in an amount of about 50 parts by weight to about 70 parts by weight, based on 100 parts by weight of the composition. When the amount of the filler is less than about the predetermined amount, e.g., less than about 50 parts by weight, hardness may be reduced below standard and insufficient rigidity may result, which is unsuitable for obtaining turning stability when driving a vehicle. When the amount of the filler is greater than about the predetermined amount, e.g., greater than about 70 parts by weight, hardness exceeds standard and excessive rigidity may result, which is unsuitable for meeting torsion tolerance design requirements.

The coupling agent is not particularly limited, so long as it is able to improve dispersion and compatibility between different kinds of rubber by modifying the interface between natural rubber and synthetic rubber, namely ethylene/α-olefin/non-conjugated polyene copolymer, and also to improve the physical properties of the materials by maximizing the bonding force between the filler and the rubber.

The coupling agent may be a silane-based coupling agent for improving interfacial modification, preferably a silane-based coupling agent having an alkoxy group. For example, it may include one or more selected from the group consisting of tetraethoxysilane, tetramethoxysilane, tetrapropoxysilane, tetraisopropoxysilane, hexaethoxydisilane, and mixtures thereof, and preferably includes tetraethoxysilane (TEOS), which reacts with the remaining double bond to modify the interface, thus improving dispersion and compatibility between different kinds of rubber and maximizing the bonding force between the filler and the rubber, thereby improving material properties.

The coupling agent may be included in an amount of about 1 part by weight to 10 parts by weight, based on 100 parts by weight of the composition. When the amount of the coupling agent is less than about the predetermined amount, e.g., less than about 1 part by weight, the interfacial modification effect is insufficient and the compatibility effect is insufficient, making it difficult to satisfy dispersibility. When the amount of the coupling agent is greater than about the predetermined amount, e.g., greater than 10 parts by weight, the interaction between different kinds of nibber or between the filler and the rubber may be interrupted, so the intrinsic properties of each component may be deteriorated.

Also, the rubber composition may further include an additive, the additive specifically including one or more selected from the group consisting of an activator, an antioxidant, sulfur, and a vulcanization accelerator.

The activator may be added to activate the crosslinking reaction of the rubber using sulfur that is added. The activator may include those commonly used in the art, and preferably may include a mixture of zinc oxide and stearic acid. In particular, the amount of zinc oxide and stearic acid is adjusted to about 7 parts by weight to 9 parts by weight, based on 100 parts by weight of the composition, so as to prevent deterioration of physical properties due to the inclusion thereof For example, zinc oxide may be included in an amount of about 6 parts by weight to 7 parts by weight, based on 100 parts by weight of the composition. When the amount of zinc oxide is less than the predetermined value, e.g., less than about 6 parts by weight, the fatigue durability of the rubber material may be reduced due to deterioration of crosslinking activity, and when the amount of zinc oxide is greater than the predetermined value, e.g., greater than about 7 parts by weight, unreacted materials may be generated, which leads to deterioration of the physical properties of the rubber material, and moreover, it is difficult to satisfy requirements related to optimal mixing time and temperature conditions.

On the other hand, stearic acid may be preferably included in an amount of about 1 part by weight to 2 parts by weight, based on 100 parts by weight of the composition. When the amount of stearic acid is less than the predetermined amount, e.g., less than about 1 parts by weight, the fatigue durability of the rubber material may be reduced due to deterioration of crosslinking activity, and when the amount of stearic acid is greater than the predetermined amount, e.g., greater than about 2 parts by weight, unreacted materials may be generated, which leads to deterioration of the physical properties of the rubber material, and moreover, it is difficult to satisfy requirements related to optimal mixing time and temperature conditions.

Sulfur may be used as a crosslinking agent to ensure physical properties such as rigidity and strength. Sulfur may be included in an amount of about 0.8 parts by weight to about 1.2 parts by weight, based on 100 parts by weight of the composition. When the amount of sulfur is less than the predetermined amount, e.g., less than about 0.8 parts by weight, long-term fatigue durability may be lowered due to a decrease in crosslinking density. When the amount of sulfur is greater than the predetermined amount, e.g., greater than about 1.2 parts by weight, the number of S—S—S bonds is increased compared to the C—S—C bond structure in the crosslinked chain structure due to excessive crosslinking reactions, and thus easy destruction upon application of a thermal load may occur. The heat resistance of the S—S—S bond structure is insufficient, which may adversely affect the physical properties of rubber materials over the long term.

The vulcanization accelerator may be used to improve the crosslinking rate of sulfur, and preferably, tetramethylthiuram disulfide (TMTD) may be included in an amount of about 1.8 parts by weight to 2.2 parts by weight, based on 100 parts by weight of the composition. When the amount of the vulcanization accelerator is less than the predetermined amount, e.g., less than about 1.8 parts by weight, the improvement in heat resistance by delaying the vulcanization time may be insignificant due to the insufficient effect of accelerating the crosslinking rate. When the amount thereof is greater than the predetermined amount, e.g., greater than about 2.2 parts by weight, it is difficult to ensure optimal mixing time and temperature conditions because of the excessive effect of accelerating the crosslinking rate, and the physical properties of the rubber material may be deteriorated due to scorching.

The antioxidant may be used to improve fatigue resistance and ozone resistance. The antioxidant may suitably include a quinone-based antioxidant, particularly 2,2,4-trimethyl-1,2-dihydroquinoline (TMQ), and a microwax, particularly N-isopropyl-N'-phenyl-p-phenylenediamine (IPPD).

In particular, 2,2,4-trimethyl-1,2-dihydroquinoline (TMQ) may be included in an amount of about 1.3 parts by weight to 1.8 parts by weight, and N-isopropyl-N'-phenyl-p-phenylenediamine (IPPD) may be included in an amount of about 1.3 parts by weight to 1.8 parts by weight based on 100 parts by weight of the composition. When the amount of TMQ or IPPD is less than the predetermined amount, e.g., less than about 1.3 parts by weight, long-term heat resistance may be deteriorated due to insufficient heat aging. When the amount of TMQ or IPPD is greater than the predetermined amount, e.g., greater than about 1.8 parts by weight, adhesion may be deteriorated due to blooming, and durability may be deteriorated, leading to increased possibility of damage.

The rubber composition may include the copolymer as describe herein, natural rubber, a filler, and a coupling agent at appropriate ratios, and also appropriately includes an additive. Thus, compatibility is improved, so physical properties may be improved, and moreover, superior heat resistance, fatigue resistance, and compression set resistance may be exhibited.

Accordingly, the rubber composition may be used for a vehicle part, e.g., a stabilizer bar rubber bushing and a suspension bushing, which is located near an engine room and thus requires heat resistance.

EXAMPLE

A better understanding of the present invention may be obtained through the following examples. These examples are merely set forth to illustrate the present invention, and are not to be construed as limiting the present invention.

Examples 1 to 3 and Comparative Examples 1 to 6: Preparation of Rubber Sample of Rubber Composition Rubber samples of rubber compositions according to Examples 1 to 3 and Comparative Examples 1 to 6 were prepared by mixing components in the amounts shown in Table 1 below.

The rubber compositions obtained using the components in the amounts shown in Table 1 below were kneaded, after which plate-like rubber samples were finally manufactured.

TABLE 1

| Classification (parts by weight) | | Example | | | Comparative Example | | | | | |
|---|---|---|---|---|---|---|---|---|---|---|
| | | 1 | 2 | 3 | 1 | 2 | 3 | 4 | 5 | 6 |
| Natural rubber | | 40 | 30 | 50 | 40 | 40 | 40 | 40 | — | 100 |
| EPD | Oil (X) | 40 | 45 | 35 | 40 | 40 | 40 | 40 | 33 | — |
| M | Oil (O) | 20 | 25 | 15 | 20 | 20 | 20 | 20 | 67 | — |
| Filler | FEF | 60 | 60 | 60 | 45 | 75 | 60 | 60 | 50 | 50 |
| Coupling agent | TEOS | 4 | 3 | 5 | 4 | 4 | — | 11 | — | — |
| Activator | ZnO | 7 | 7 | 7 | 7 | 7 | 7 | 7 | 7 | 5.5 |
| | St-Acid | 1.5 | 1.5 | 1.5 | 1.5 | 1.5 | 1.5 | 1.5 | 1.5 | 1.5 |
| Sulfur | Sulfur | 1.0 | 1.0 | 1.0 | 1.0 | 1.0 | 1.0 | 1.0 | 1.0 | 1.0 |
| Vulcanization accelerator | TMTD | 2.0 | 2.0 | 2.0 | 2.0 | 2.0 | 2.0 | 2.0 | 2.0 | 2.0 |
| Antioxidant | IPPD | 1.5 | 1.5 | 1.5 | 1.5 | 1.5 | 1.5 | 1.5 | 2.0 | 2.0 |
| | TMQ | 1.5 | 1.5 | 1.5 | 1.5 | 1.5 | 1.5 | 1.5 | 1.5 | 1.5 |

Evaluation Criteria and Evaluation Method

Hardness (Shore A): Measured according to ISO 7619-1, 18898

Tensile strength/elongation: Measured according to ISO 37 TYPE 1A at a speed of 500 mm/min Heat resistance (heat aging resistance): Measured according to ISO 9272, 23529, 11346

Compression set: Measured based on ISO 815-1 (100° C./22 hr compression)

Fatigue durability: Measured based on MS270-05, 3.3 Hz, and −10 to 10 mm repetitive translational motion Evaluation Results The results of evaluation of the rubber samples of the rubber compositions manufactured using the components in the amounts according to Table 1 based on the evaluation criteria described above are shown in Table 2 below.

TABLE 2

| Classification (parts by weight) | | Standard (MS) | Example | | | Comparative Example | | | | | |
|---|---|---|---|---|---|---|---|---|---|---|---|
| | | | 1 | 2 | 3 | 1 | 2 | 3 | 4 | 5 | 6 |
| State properties | Hardness (Hs) | 65 ± 5 | 67 | 69 | 65 | 58 | 71 | 65 | 67 | 62 | 65 |
| | Tensile strength (kg f/cm$^2$) | 200 or more | 225 | 210 | 230 | 210 | 260 | 165 | 195 | 210 | 260 |
| | Elongation (%) | 450 or more | 490 | 480 | 510 | 550 | 430 | 380 | 440 | 500 | 540 |

TABLE 2-continued

| Classification (parts by weight) | | Standard (MS) | Example | | | Comparative Example | | | | | |
|---|---|---|---|---|---|---|---|---|---|---|---|
| | | | 1 | 2 | 3 | 1 | 2 | 3 | 4 | 5 | 6 |
| Heat resistance (85° C. × 1,000 hr) | Hardness change (ΔHs) | −2 to +5 | +2 | +1 | +2 | +2 | +2 | +4 | +4 | +1 | +4 |
| | Tensile strength change (%) | Within −30 | −10 | −10 | −12 | −10 | −18 | −17 | −15 | −11 | −25 |
| | Elongation change (%) | Within −40 | −13 | −15 | −20 | −23 | −14 | −23 | −30 | −15 | −37 |
| Heat resistance (130° C. × 70 hr) | Hardness change (ΔHs) | −2 to +10 | +3 | +3 | +5 | +4 | +3 | +5 | +5 | +3 | +10 |
| | Tensil strength change (%) | Within −30 | −17 | −17 | −21 | −18 | −25 | −33 | −24 | −15 | −48 |
| | Elongation change (%) | Within −40 | −26 | −23 | −30 | −33 | −24 | −42 | −20 | −19 | −72 |
| Compression set (%) | | 30 or less | 26 | 28 | 23 | 25 | 20 | 35 | 32 | 33 | 20 |
| Fatigue durability | | $10^4$ × Cycle 5.0↑ | 5.5 | 5.1 | 6.0 | 6.7 | 4.7 | 2.2 | 3.7 | 3.8 | 7.2 |

As shown in Table 2, the rubber samples of the rubber compositions for which the amount of the filler fell outside of the range of the rubber composition in Comparative Examples 1 and 2 were problematic in that hardness was low when the amount of the filler was too small, whereas hardness was excessively high and elongation was low when the amount of the filler was too large. Also, the rubber samples of the rubber compositions for which the amount of the coupling agent fell outside of the range of the rubber composition in Comparative Examples 3 and 4 were problematic in that tensile strength and elongation were too low when the amount of the coupling agent was zero or too large.

Moreover, in the rubber samples of the rubber compositions not including both natural rubber and EPDM (Comparative Examples 5 and 6), unlike the rubber composition according to an exemplary embodiment of the present invention, compression set was too high and fatigue durability was too low in the absence of natural rubber, and the change in tensile strength or change in elongation depending on heat resistance was too low in the absence of EPDM.

In contrast, in the rubber samples prepared with the rubber composition according to exemplary embodiments of the present invention (Examples 1 to 3), state properties such as hardness, tensile strength, and elongation satisfied corresponding standards, and moreover, heat resistance, compression set, and fatigue durability all satisfied corresponding standards.

Particularly, the rubber composition according to exemplary embodiments of the present invention included the ethylene/α-olefin/non-conjugated polyene copolymer, the natural rubber, the filler, and the coupling agent at appropriate ratios, so the ethylene/α-olefin/non-conjugated polyene copolymer, the natural rubber, and the filler were thoroughly dispersed and compatibility was improved, whereby physical properties were improved, and moreover, superior heat resistance, fatigue resistance, and compression set resistance were exhibited.

According to various exemplary embodiments of the present invention, the rubber compositions suitably include a copolymer including ethylene, α-olefin, and non-conjugated polyene, natural rubber, a filler, and a coupling agent, so the copolymer, the natural rubber, and the filler may be uniformly dispersed. The compatibility of the composition may be improved, thereby improving physical properties and also exhibiting superior heat resistance, fatigue resistance, and compression set resistance.

The invention has been described in detail with reference to exemplary embodiments thereof. However, it will be appreciated by those skilled in the art that changes may be made in these embodiments without departing from the principles or spirit of the invention, the scope of which is defined in the appended claims and their equivalents.

What is claimed is:

1. A rubber composition, comprising:
   a copolymer comprising ethylene, a-olefin, and non-conjugated polyene;
   a natural rubber;
   a filler; and
   a coupling agent,
   wherein the copolymer comprises an amount of 15 parts by weight to 25 parts by weight of an oil-extended ethylene/propylene/non-conjugated diene terpolymer (oil-extended EPDM) and an amount of 35 parts by weight to 45 parts by weight of a non-oil-extended ethylene/propylene/non- conjugated diene terpolymer (non-oil-extended EPDM), based on 100 parts by weight of the composition.

2. The rubber composition of claim 1, wherein the coupling agent comprises a compound containing silicon (Si).

3. The rubber composition of claim 1, comprising:
   an amount of 50 parts by weight to 70 parts by weight of the copolymer;
   an amount of 30 parts by weight to 50 parts by weight of the natural rubber;
   an amount of 50 parts by weight to 70 parts by weight of the filler; and
   an amount of 1 part by weight to 10 parts by weight of the coupling agent, based on 100 parts by weight of the composition.

4. The rubber composition of claim 1, wherein the oil-extended EPDM comprises an amount of 65 mass % to 75 mass % of a repeating unit derived from ethylene based on a total of 100 mass % thereof.

5. The rubber composition of claim 1, wherein the non-oil-extended EPDM comprises an amount of 65 mass % to 75 mass % of a repeating unit derived from ethylene based on a total of 100 mass % thereof.

6. The rubber composition of claim 1, wherein the filler comprises carbon black having a particle diameter of 40 nm to 44 nm.

7. The rubber composition of claim 1, further comprising an additive comprising one or more selected from the group consisting of an activator, an antioxidant, sulfur, and a vulcanization accelerator.

8. A vehicle part comprising a rubber bushing composition of claim 1.

9. A vehicle comprising a rubber bushing composition of claim 1.

* * * * *